United States Patent [19]

Okada et al.

[11] Patent Number: 4,727,592
[45] Date of Patent: Feb. 23, 1988

[54] OPTICAL COMMUNICATION SYSTEM

[75] Inventors: Akihiro Okada; Shun Suzuki; Osamu Takahashi, all of Kawasaki; Kiyotaka Shikata, Yokohama, all of Japan

[73] Assignee: Fujitsu Limited, Kawasaki, Japan

[21] Appl. No.: 47,592

[22] Filed: May 11, 1987

Related U.S. Application Data

[63] Continuation of Ser. No. 758,787, Jul. 25, 1985.

[30] Foreign Application Priority Data

Jul. 25, 1984 [JP] Japan .................. 59-153124
Oct. 19, 1984 [JP] Japan .................. 59-218271

[51] Int. Cl.$^4$ .......................... G02F 1/00; H04J 1/10
[52] U.S. Cl. .................................. 455/601; 455/607; 371/4; 370/15; 370/85
[58] Field of Search ............... 455/601, 606, 607, 612; 370/1, 85, 13, 15, 60; 340/825.5, 825.51; 371/4, 65; 328/120

[56] References Cited

U.S. PATENT DOCUMENTS

| | | | |
|---|---|---|---|
| 4,081,612 | 3/1978 | Hafner | 370/60 |
| 4,161,786 | 7/1979 | Hopkins et al. | 370/94 |
| 4,466,110 | 8/1984 | Kizaki et al. | 328/120 |
| 4,500,989 | 2/1985 | Dahod | 370/85 |
| 4,503,533 | 3/1985 | Tobagi et al. | 370/85 |
| 4,531,238 | 7/1985 | Rawson et al. | 455/607 |

FOREIGN PATENT DOCUMENTS

| | | | |
|---|---|---|---|
| 0079347 | 5/1983 | Japan | 455/601 |
| 0114638 | 7/1983 | Japan | 455/601 |

Primary Examiner—Robert L. Griffin
Assistant Examiner—Andrew J. Telesz, Jr.
Attorney, Agent, or Firm—Staas & Halsey

[57] ABSTRACT

An optical communication system including repeaters which return a preamble signal to the receive line as soon as it detects a carrier on the transmit line of a single line optical bus. Therefore, transmission equipment can confirm data transmission quickly because the time delay between data transmission and its confirmation is decreased. The repeater also monitors a time delay associated with the return through a return loop of the transmitted data, and produces and transmits a failure signal when the time delay is longer than a predetermined value. The system also includes an optical transceiver connected between the optical bus and the transmission equipment which converts optical signals into electrical signals and visa versa and also adds the preamble signal to the front of data to be transmitted.

10 Claims, 16 Drawing Figures

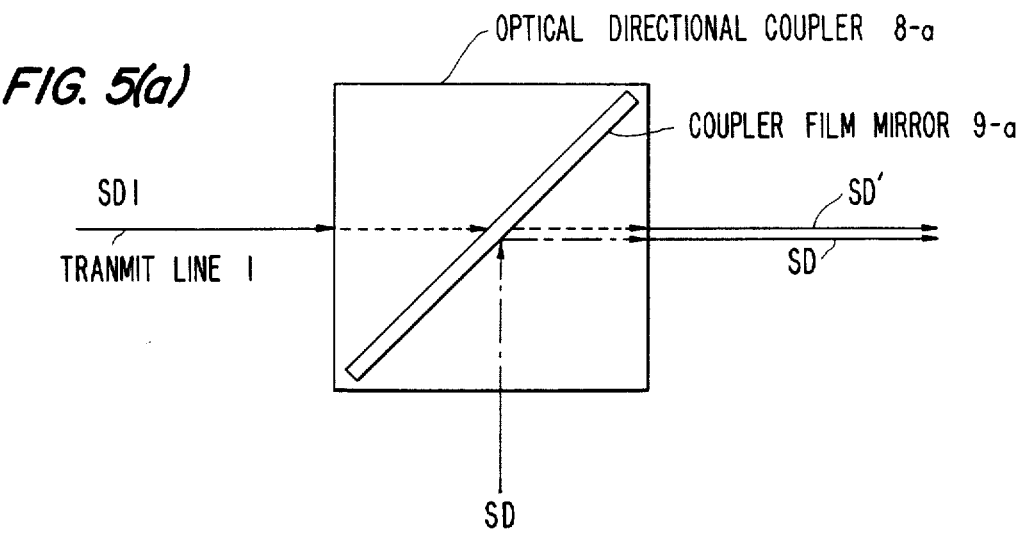
FIG. 5(a)
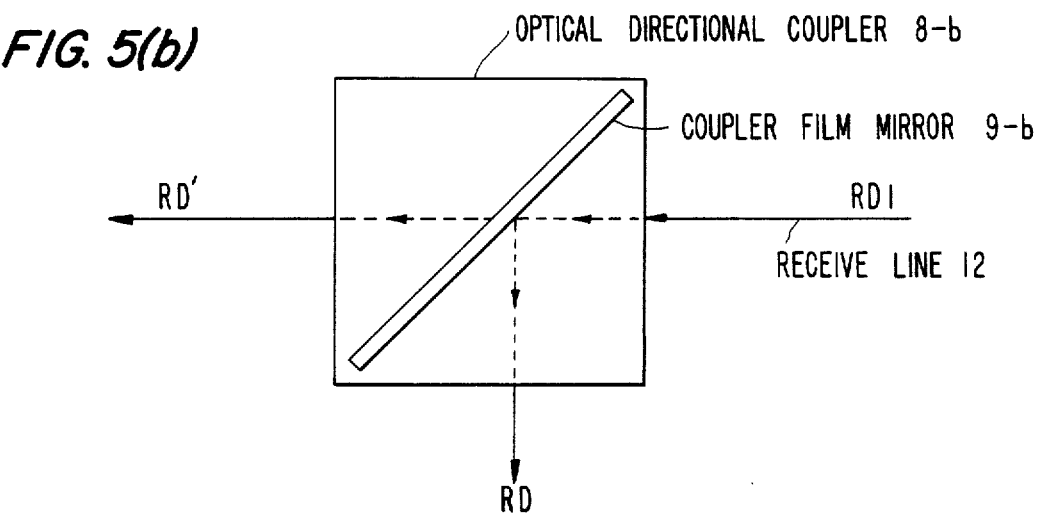
FIG. 5(b)
FIG. 6
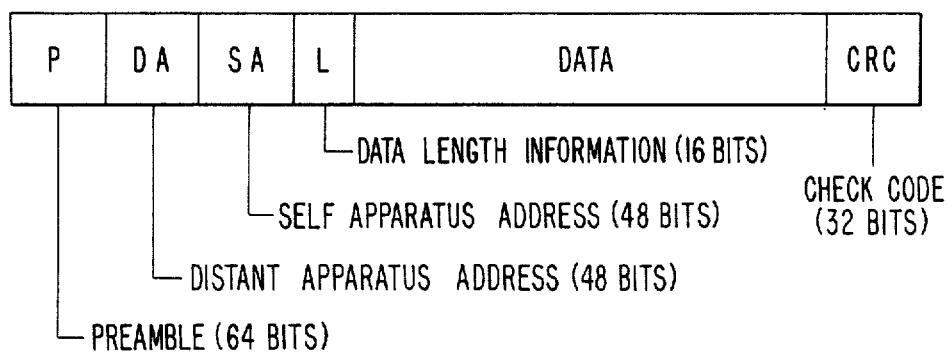

OPTICAL COMMUNICATION SYSTEM

This is a continuation of co-pending application Ser. No. 758,787 filed on July 25, 1985.

BACKGROUND OF THE INVENTION

1. Field of the Invention

The present invention relates to an optical communication system in which a plurality of data transmission units are connected to a U-shaped or S-shaped one-way optical transmission line, and particularly to an optical bus network including repeaters and transceivers utilizing CSMA/CD (Carrier Sense Multiple Access/Collision Detection).

2. Description of the Related Art

In recent years, local area networks which connect computer systems and data terminals located at different points in the same building or factory have been attracting public attention as a basic means of accomplishing office automation and factory automation, and various systems have been proposed and put into a practical use. A bus type communication system using CSMA/CD is the most famous among those mentioned above, and is simple in structure and low in cost. The typical system of this type is a local area network called Ethernet which was announced after joint development by DEC, Intel and Xerox.

FIG. 1 illustrates the basic structure of this system where nodes A and B in separate locations are connected by a bus consisting of a coaxial cable. In general, several tens of nodes are connected to the same bus. In FIG. 1, only two nodes A and B are shown for simplicity. Each node A and B is composed of a transmitter TX which receives send data SD and transmits on the coaxial cable, a receiver RX which receives data flowing on the coaxial cable and sends it to the node terminal (not shown) as received data RD, a collision detection circuit D which detects collisions between transmission and reception and sends a collision detection output CD to the node terminal and a tap T which physically connects the transmitter TX and receiver RX to the coaxial cable.

FIG. 2 illustrates the operation of a communication system using CSMA/CD. Usually, each node A, B and C monitors communication between other nodes on the bus during their communication using a carrier sense technique and starts transmission only when an idle condition is confirmed. The communication burst A of the node A and the burst B of the node B shown in FIG. 2, as illustrated, are sent separately and the communication is successful. However, when transmission by one node is started after an idle condition is confirmed by that node, other nodes may sometimes start sending data at the same time. In such a situation, the send bursts collide on the bus. In the CSMA/CD system, when such collision is detected between, for example, nodes A and C, the nodes which have started transmission immediately stop and each node starts re-transmission after a certain period of time preset in accordance with a random number for each node. The send bursts $A_2$ and C in FIG. 2 illustrate such re-transmission. A local area network such as this is capable of freely sending or receiving data between selected terminals through network or sending simultaneously data to several terminals from a single terminal.

Since the local area network shown in FIG. 1 is restricted in bandwidth because of the coaxial cable, it is difficult to send a wide band signal, it is difficult to transmit at a high speed and transmission quality is reduced by noise resulting from the mismatching of impedance at the coupling points of the nodes and the coaxial cable. As a result, an optical bus network, where the local area network uses an optical fiber cable in place of a coaxial cable, has been developed.

When sending or receiving an optical signal using the optical fiber cable used as the transmission line, a structure using one-way transmission is generally employed because of the mutual influence that transmitted and received optical signals can have on each other and because of the characteristics of optical directional couplers. When such one-way transmission is employed, the transmit and receive lines are formed in pairs to form the transmission line bus. U-shaped and S-shaped transmission lines are used as the transmission lines in such local area networks. When an optical fiber is used in the U or S shaped lines, transmission loss caused by the optical fiber itself is small, but loss in the optical signal coupling and separating apparatus for connecting data transmission unit nodes is large and, therefor, it is necessary to amplify the optical signal repeatedly by providing repeaters even for a comparatively short transmission line such as in a local area network.

FIG. 3 shows a U-shaped transmission line, as discussed above, in which resistive terminators 3 and 4 are provided at one end of the transmit line 1 and receive line 2, repeaters 5-1-5-$n$ are provided at specified distances, the othe end of the transmit line 1 and receive line 2 are connected by return loops, and the data transmission units or transceivers (nodes) 7-1-7-$m$ are connected to the transmit line 1 and receive line 2. Connection of data transmission units 7-1-7-$m$ with the transmit line 1 is established through an optical directional coupler 8-$a$, while connection with the receive line 2 is established through an optical directional coupler 8-$b$.

FIGS. 5($a$) and ($b$) respectively illustrate the operation of the optical directional couplers 8-$a$ and 8-$b$. The optical directional coupler 8-$a$, which inserts the send signal SD of the data transmission units 7-1-7-$m$ to the transmit line 1, is composed of a coupler film mirror 9-$a$ which allows the signal $SD_1$ on the transmit line 1 to directly pass back to the transmit line 1 as SD1. The transmit signal SD sent from the data transmission units 7-1 -7-$m$ is totally reflected by the coupler film mirror 9-$a$ and directly sent to the transmit line 1. The optical directional coupler 8-$b$ which branches the received signal $RD_1$ on the receive line 2 to the data transmission units 7-1 -7-$m$ is composed of a coupler film mirror 9-$b$. The coupler film mirror 9-$b$ partially passes the received signal $RD_1$ on the receive line 2 and sends it back to the receive line 2 as the signal RD1 and also branches the signal to the data transmission units 7-1-7-$m$ as the receive signal RD. Accordingly, the repeaters 5-1-5-$n$ are provided in accordance with the number of optical directional couplers 8-$a$ and 8-$b$, and as a result of the number of data transmission units 7-1-7-$m$ and thereby the optical signal on the transmission line can be repeated through amplification and waveform shaping, etc.

FIG. 4 shows the S-shaped transmission line, as explained above, in which resistive terminators 13 and 14 are provided on one end of transmit line 11 and on one end of receive line 12, the other end of the transmit line 11 is connected to the other end of receive line 12 through a return loop 16, repeaters 15-1-15-$n$ are provided at specified distances on the line pair. The three lines line 11, 12 and 16 are connected in the shape of an S (or a letter Z) and data transmission units 17-1-17-m are connected to the transmit line 11 and the receive line 12. In this S-shaped transmission line, a signal is not inserted or branched in the return loop 16 and therefore the signal need not be amplified and repeated while in the loop 16, but it is of course possible to form a structure in which the signal is amplified and repeated by the repeaters 15-1-15-n while in the loop 16. The operations of optical directional couplers 8-a and 8-b are the same as those in FIG. 5.

Explained hereunder are operations when the CSMA/CD system is employed for sending and receiving control in the optical bus network constructed as shown in FIG. 3 and FIG. 4. In the U-shaped transmission line as explained above, upon detection of a lack of data on the receive line 2 sent through the return loop 6 from the transmit line 1, data is sent to the transmit line 1 from the data transmission units 7-1-7-m. For example, if data is sent from the data transmission unit 7-1 to the data transmission unit 7-2, the data is sequentially amplified and repeated by the repeaters 5-1-5-n and is carried by the receive line 2 after it is returned by the return loop 6. The data on this receive line 2 is also amplified and repeated by the repeaters 5-1-5-n and received by the data transmission unit 7-2. The remaining signal is applied to the resistive terminator 14. The data sent from the data transmission unit 7-1 is returned by the return loop 6 attached to the transmit line 1 and is sent to the receive line 2 and then received and detected by the data transmission units 7-1-7-m. Therefore, the data transmission units 7-2-7-m determine that the other data transmission units are busy, determine whether the data is addressed itself in accordance with its address and the send data transmission unit 7-1 determines whether the data sent therefrom has been returned or not.

In the S-shaped transmission line, the data transmission units 17-1-17-m determine whether there is data on the receive line 12 and control transmission of data because the data on the transmit line 11 is returned by the return loop 16 and carried by the receive line 12.

An apparatus or terminal having an interface conforming to IEEE regulation 802.3 for for the existing coaxial network is generally connected to such optical network. The IEEE regulation 802.3 specifies access procedures and electrical characteristic of the interface. For example, a maximum delay time for the network is set to 51.2 microseconds and, as shown in FIG. 6, the data packet format includes a preamble P of 64 bits, a distant (receive) apparatus address DA of 48 bits, a self (transmit) apparatus address SA of 48 bits, data length information L of 16 bits, data DATA of N×8 bits and a check code CRC of 32 bits. The preamble P is composed of a pattern where "10101010" is sent seven times and finally "10101011" is sent. The time from the detection of a collision in the CSMA/CD system and sending of jam pattern of 32 bits or 48 bits after detection of collision is also specified.

The delay time of the network mentioned above is defined by the period from the sending of a signal on the transmit line 1, from the data transmission unit 7-1 in FIG. 3, to the reception of such a signal on the receive line 2 by the same apparatus. Therefore, expansion of the network and the scale of network is severely restricted. It is difficult to add data transmission units to a system using interfaces conforming to the interface procedures specified by IEEE regulation 802.3.

The repeaters 5-1-5-n of FIG. 3 are respectively provided with optical semiconductor elements such as a light sensing and emitting elements which convert an optical signal to an electrical signal and convert the signal again into an optical signal after amplification and waveform shaping. As shown in FIG. 7(a), the light emitting elements (LED, LD) suddenly increase in optical output when a drive current exceeds a predetermined threshold value $I_B$. In an ordinary optical communication system, a drive current is controlled such that a bias current $I_B$ is applied to the light emitting element, to help control and speed up the optical output for ON-OFF control. In the optical bus network employing the CSMA/CD system, sending and receiving operations are controlled by detecting the existence of data (existence of an optical signal) on the receive line. A light emitting element can often send an erroneous optical signal because of noise, etc. especially when a bias current $I_B$ is always applied and erroneous detection of data on the receive line occurs.

Accordingly, in such an optical bus network, when the data transmission unit or repeater is not sending or receiving a signal, a bias current $I_B$ is not applied and the light emitting element is kept in the completely OFF condition. A bias current $I_B$ is applied after the light sensing element receives a signal to transmit in order to mor easily control the ON and OFF of the light emitting element. Thereby, as shown in FIG. 7(b), the time period ($t_2-t_1$) from the time $t_1$ for receiving the preamble patter indicating the heading part of the data to the time $t_2$ for sending the optical signal, after the transient condition of the light emitting element has passed, is long and the data received during this time period disappears. Namely, since preprocessing for electrical-to-optical conversion by the photo semiconductor element is required, the optical signal is not sent during the initial rise period. As a result, the signal is partly attenuated by each of the optical repeaters.

In a network utilizing a transmission line such as a coaxial cable, when repeaters are provided to compensate for loss in the transmission line, loss of the carried signal by the repeaters can be suppressed by as much as several bits to several ten of bits. Since loss of signal by insertion and branching thereof is small in the coaxial cable, a system can be configured using only two repeaters in the local area network. Therefore, data transmission can be realized by adding a comparatively short preamble pattern.

Using the interface procedures of IEEE regulation 802.3 in an optical network results in a disadvantage in that, since the preamble pattern is specified as 64 bits, not only the preamble P but also addresses DA and SA can be lost by attenuation of the signal by the optical repeaters. In such a situation, communication is no longer possible.

Because the optical network has only one direction of communication from the point of view of control, construction, cost and reliability, the U-shaped or S-shaped networks are used. When a network is formed using an optical transmission line, the transmitting signal is returned by the return loop of the U-shaped or S-shaped transmission line and received and detected to determine whether transmission has occurred. Unlike the coaxial cable network, the fact of transmission cannot be detected immediately. Accordingly, when a device having an interface specified by IEEE regulation 802.3 is connected to an optical network, it does not conform to the regulation and some modification is required of the device for the connection to the optical network.

In a CSMA/CD optical system, such as illustrated in FIG. 4, data transmission is started after absence of data on the receive line 2 is detected. The data transmission unit 7-m nearest the return loop 6 has a high probability of acquiring the right of transmission, resulting in a transmission priority in accordance with transceiver connecting position on the bus and preventing construction of a network having equal access priority for all transceivers. To prevent such an inherent transmission priority, it has been proposed that the timing associated with detecting the data on the receive line 2 in the data transmission units 7-1-7-m be preset corresponding to the transmission delay time. This system, however, has a disadvantage in that it allows the maximum transmission delay time to become large in accordance increases in the scale of the network making the efficiency of the network low.

In the S-shaped transmission line shown in FIG. 4, for example, the time required for transmitting the data sent from the data transmission unit 17-1 nearest the resistive terminator 13 to the receive line 12 through the return loop 16 so that it is detected by the data transmission unit 17-1 is almost equal to the time required by the data sent by the data transmission unit 17-m nearest the resistive terminator 14 for transmission over the receive line 12 after being carried by the return loop 16 to be detected by the data transmission unit 17-m and, therefore, the transmission priority due to the connecting position of the data transmission unit does not result.

However, this S-shaped transmission line has a disadvantage in that since the return loop 16, which is the same length as the transmitting line 11 or receive line 12, is required, total transmission delay time becomes very large, detection of data on the transmission line is also delayed and the probability of creating a collision between transmitted data becomes high.

SUMMARY OF THE INVENTION

It is an object of the present invention to provide an optical communication system which can be extended easily to support interface procedures of IEEE regulation 802.3.

It is another object of the present invention to provide an optical transceiver which can be directly connected to a terminal or other data transmission equipment having an interface according to IEEE regulation 802.3 without changes in the equipment.

It is a further object of the present invention to provide an optical bus network which can detect data transmission (carrier) and data collision on a receive line quickly and independently of connecting location of the transmission equipment.

In the present invention, each repeater returns a preamble signal to the receive line as soon as it detects a carrier on the transmit line. Therefore, the transmission equipment can confirm data transmission quickly. As a result, the system can easily be expanded while each equipment is supported by interface conforming to a regulation specifying a maximum delay time for the system. The optical transceiver adds the preamble to the data and, as a result, data transmission equipment easily can be connected to the optical bus network. Each repeater also returns information to the receive line in accordance with a carrier or collision detection on the transmitting line. Therefore, the transmission equipment can detect data transmission from other equipment and data collision quickly.

These, together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 5(a) and 5(b) illustrates the optical directional couplers used in FIGS. 3 and 4;

FIG. 6 illustrates a packet format for a data signal;

DESCRIPTION OF THE PREFERRED EMBODIMENTS

Figure 8:
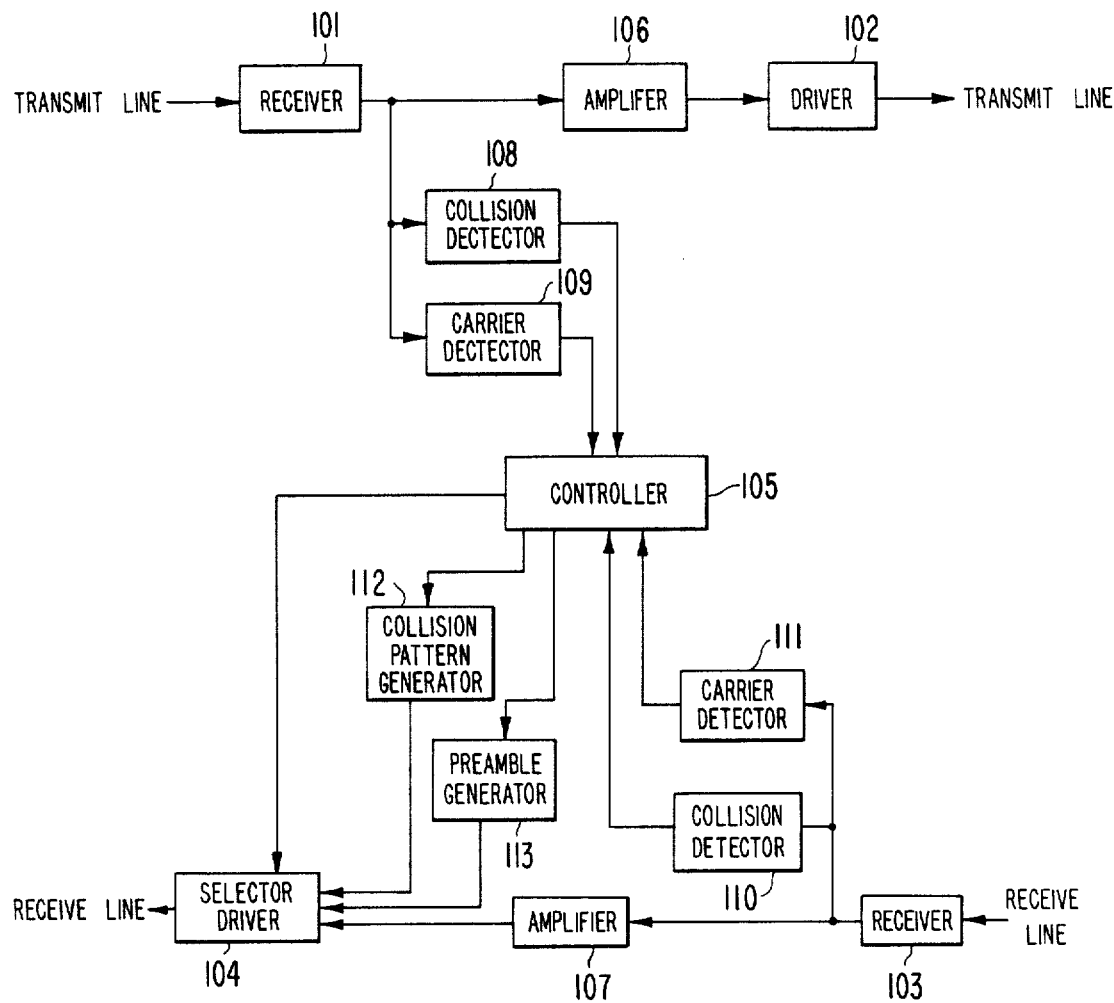
FIG. 8 is a block diagram of a repeater according to the present invention which is used in an optical communication system.

FIG. 8 is a block diagram of the repeater apparatus used in an embodiment of the present invention. The signal carried by the transmit line of the bus is applied to the amplifier 106, collision detector 108 and carrier detector 109 by the receiver 101. The amplifier 106 applies the signal to a driver 102. The signal carried on the receive line of the bus is applied to the amplifier 107, collision detector 110 and carrier detector 111 by the receiver 103. The collision detectors 108 and 110 are for detecting collision between transmitted data by determining data disturbance such as the disturbance of an encoding rule for the transmitted signal such as the Manchester encoding rules. The carrier detectors 109 and 111 are for determining existence of a transmitted signal on the line by determination of the signal level, detection of a carrier and determination of signal frequency etc. The respective detected signals are applied to the controller 105. The controller 105 starts the collision pattern generator 112 when the collision detected signal is received and also controls the selector driver 104 in order to send the collision pattern to the receive line.

When a carrier detection signal is applied to the controller 105 by the carrier detector 109, the preamble generator 113 is started to generate the preamble pattern. When a carrier is not detected by the carrier detector 111, the preamble pattern is sent to the receive line through the selector driver 104. When the carrier is detected by the carrier detector 111, the preamble pattern is sent to the receive line and added to the heading part of the data amplified by the amplifier 107.

The controller 105 also monitors whether the carrier is received by carrier detector 111 for the receive line at a time period determined by a timer (shown in FIG. 11) which starts due to carrier detection by carrier detector 109. When carrier detector 111 detects a carrier in the predetermined time period, controller 105 determines that a normal transmission has occurred, and data received on receive line is amplified by amplifier 107 and is transmitted to receive line via selector/driver 104. When carrier detector 111 does not detect a carrier in the predetermined time period, controller 105 recognizes that some kind of obstacle has occurred, and the collision pattern generator 112 is started to generate the collision pattern which is sent to the receive line.

Accordingly, since the preamble pattern or collision pattern is transmitted to the receive line by the repeater, detected more quickly that other data transmitting apparatus have started transmission and that collision has occurred than in a case where carrier detection or collision is detected using the data returned by the return loop.

Figure 9:
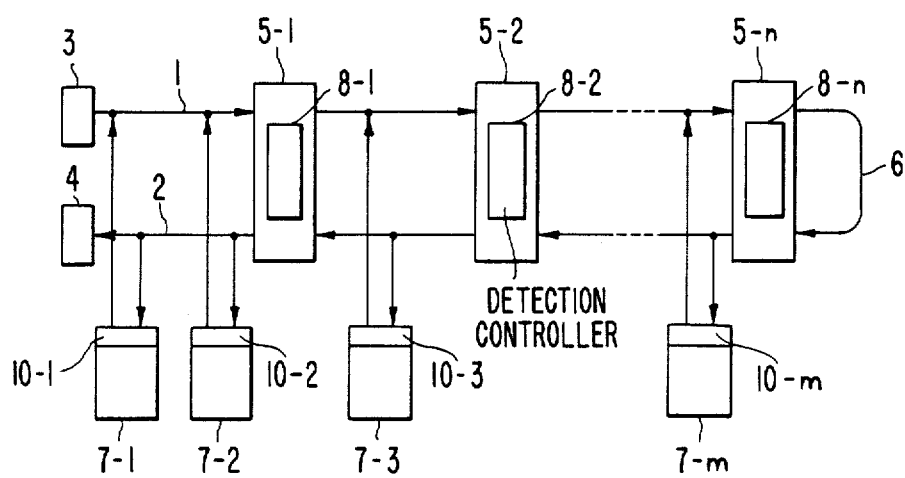
FIG. 9 is a block diagram of a bus type communication system which uses the repeaters shown in FIG. 8 in a U-shaped transmission line system.

FIG. 9 is an embodiment of the present invention which is adapted to the U-shaped transmission line. When the data transmission unit 7-1 including optical transceivers 10-1 starts data transmission, the repeater 5-1 transmits the data to the repeater 5-2 after the repeater executes processes such as amplification and waveform shaping, etc. The detection controller 8-1 in the repeater 5-1 detects the carrier and transmits the preamble pattern on the receive line 2. As a result, the data transmission unit 7-2 is capable of detecting carrier within a shorter period than in a case where the carrier is returned through the return loop 6.

The repeater 5-2 also processes the data sent from the data transmission unit 7-1 where the detection controller 8-2 detects the carrier and then transmits the preamble pattern to the receive line 2. Thereby, the data transmission unit 7-3 is capable of detecting carrier within a shorter period than that when the carrier is returned by the return loop 6.

The repeater 5-n nearest to the return loop 6 combines the preamble pattern to be sent to the receive line 2 after carrier detection, and the data returned through the return loop 6 and then sends the combined output to the repeater 5-2. In the same way, the other repeaters 5-2 and 5-1 also combine the data sent by the repeater and the preamble pattern generated after carrier detection and then sends the output to the next repeater.

Accordingly, the data transmission units 7-1 to 7-m including optical transceivers 10-1 to 10-m can detect carrier using the preamble pattern transmitted from the repeaters 5-1 to 5-n before it detects the data returned from the return loop 6. As a result, the transmission priority in accordance with connecting position of the data transmission units 7-1 to 7-m disappears and carrier is detected quickly, thereby lowering the probability of creating data collisions.

When the data transmission unit 7-1 and data transmission unit 7-3 start transmission simultaneously, the repeater 5-1 repeats the data sent from the data transmission unit 7-1 and sends it to the transmit line 1, while the detection controller 8-1 generates the preamble pattern after carrier detection and sends it to the receive line 2. The repeater 5-2 repeats the resulting collision data transmitted simultaneously by the data transmission units 7-1 and 7-3 and then sends such data to the transmitting line, while the detection controller 8-2 detects the collision by collision detecting means and transmits the collision pattern to the receive line 2. The data transmission unit 7-3 receives and detects the collision pattern, stops the transmission and starts the re-transmission.

When the detection controller 8-n detects the collision data, the repeater 5-n stops transmission of the collision data to the receive line 2 by turning off selector 104 (FIG. 8) and transmits the generated collision pattern to the receive line 2. Because each repeater includes selector 104 any repeater can act as the repeater connected to the return loop 6. An alternative method of stopping re-transmission of the collision data is to turn off amplifier 106 or 107 (FIG. 8). When the collision pattern sent to the receive line 2 by the repeater 5-2 is detected by repeater 5-1, the repeater 5-1 transmits the collision pattern generated by the detection controller 8-1 to the receive line 2. The data transmission unit 7-1 receives and detects such collision pattern and stops transmission and then starts the re-transmission. Therefore, the collision data can be detected within a shorter period than in a case where it is received and detected by the data transmission units 7-1 and 7-3 through the return.

Even though each data transmission unit 7-1, 7-2, . . . ,7-m has an interface in accordance with IEEE regulation 802.3, it is possible to ignore the maximum delay time of the network. Because, in the present system, each repeater 5-1, 5-2, . . . ,5-n monitors the maximum delay time of the network. That is, when data transmission unit 7-1 transmits data to transmit line 1, repeater 5-1 detects the carrier and immediately sends the preamble pattern to receive line 2. The data transmission unit 7-1 thereby receives the preamble pattern quickly. At the data transmission equipment 7-1, the delay time for receipt of data sent by itself is fixed by the length of the transmission lines between data transmission unit 7-1 and repeater 5-1. This situation is same at the other data transmission units. As a result, the maximum delay time of the network is fixed by the distance of each repeater from the transmit unit, because of the monitoring of the maximum delay time by repeaters. Therefore, it is easy to expand the network and the limitations on the scale of the network can be ignored while, at the same time, supporting an interface in accordance with IEEE regulation 802.3.

Figure 1:
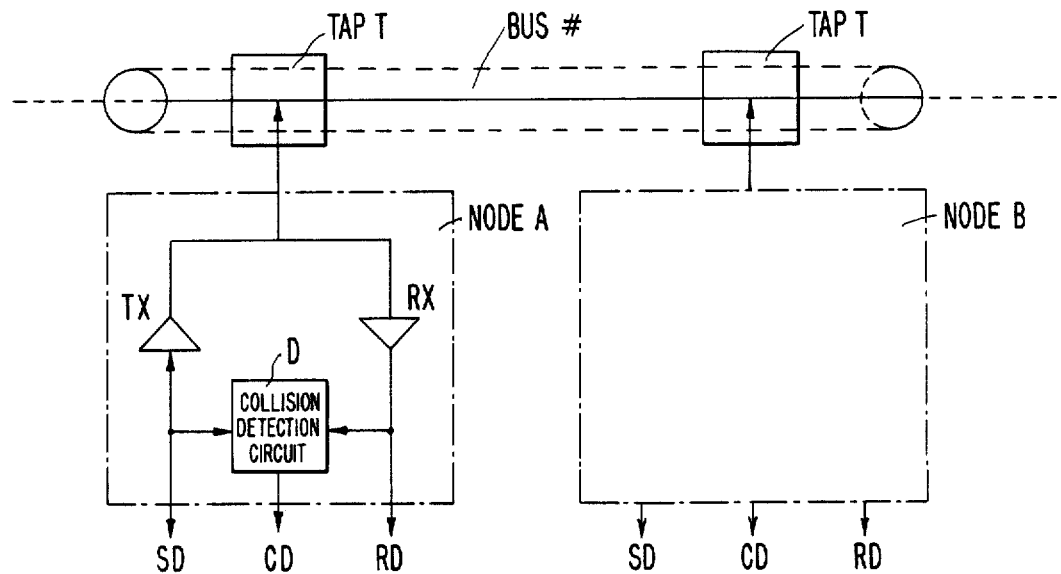
FIG. 1 a block diagram of a bus type communication system.
Figure 2:
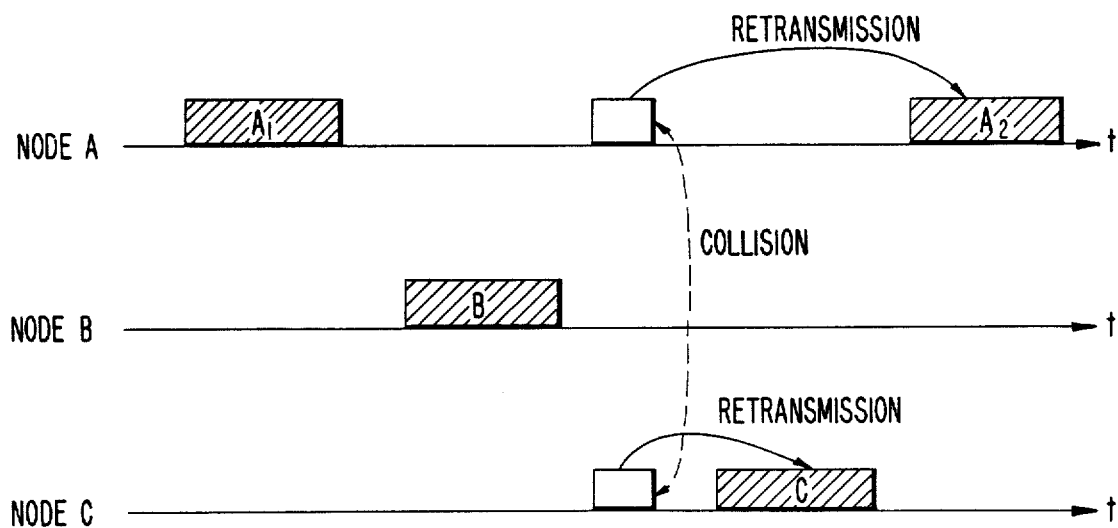
FIG. 2 illustrates the operation of a CSMA/CD communication system.
Figure 3:
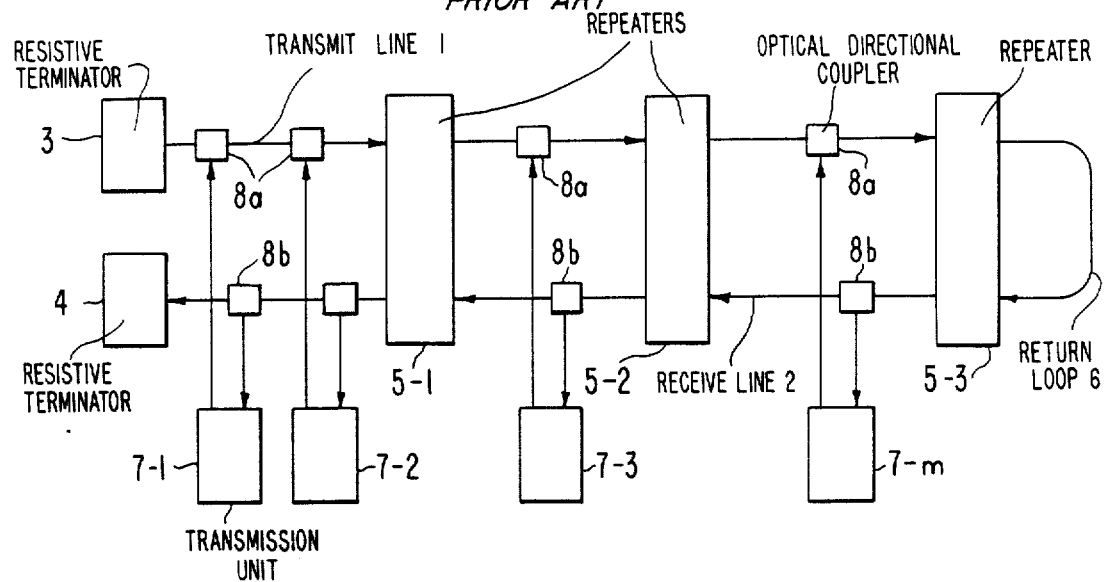
FIG. 3 is a block diagram of a bus type communication system which uses a U-shaped transmission line.
Figure 4:
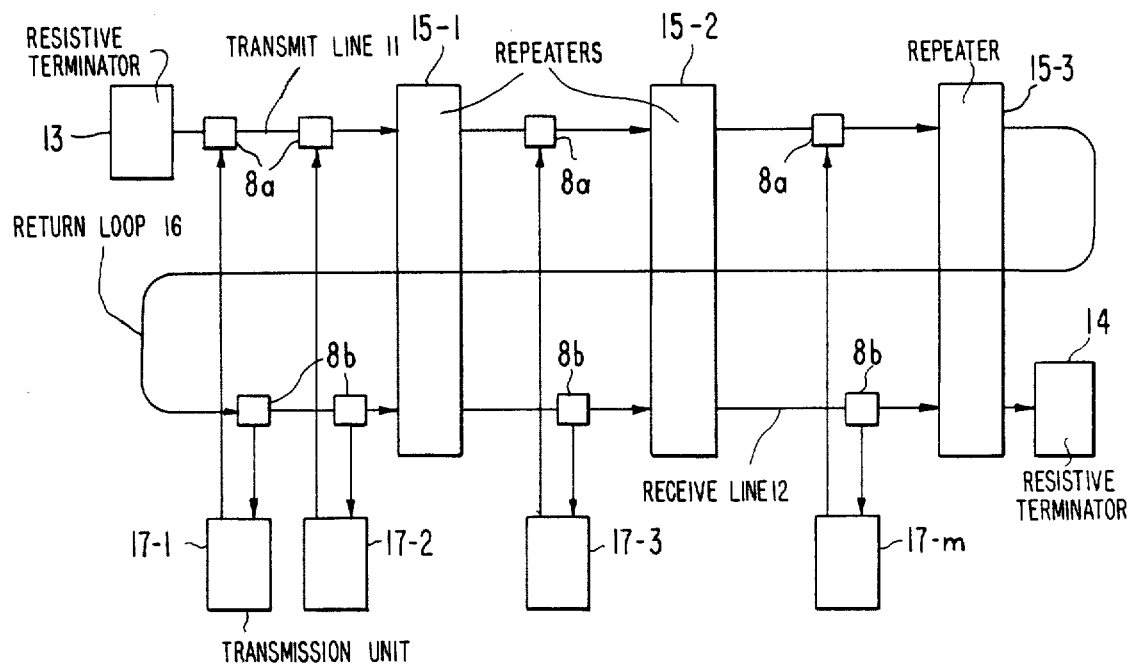
FIG. 4 is a block diagram of a bus type communication system which uses a S-shaped transmission line.
Figure 7A:
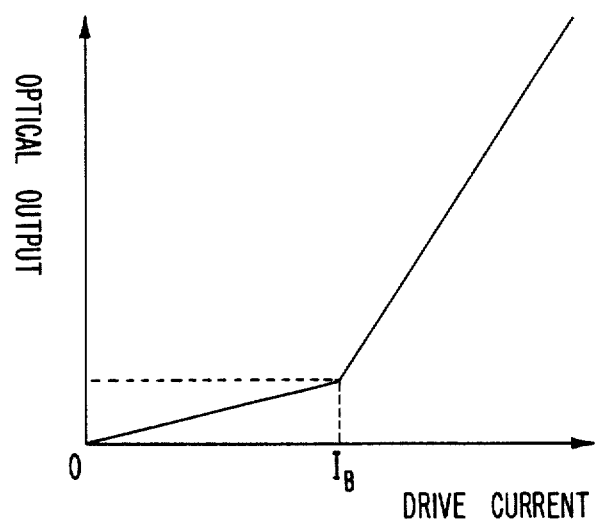
FIG. 7(a) illustrates a relationship between an optical output and a drive current.
Figure 7B:
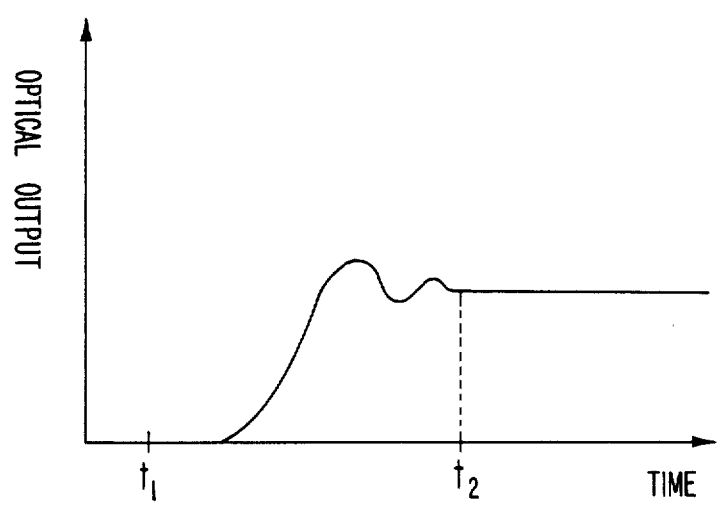
FIG. 7(b) is a waveform diagram of an optical output.
Figure 10:
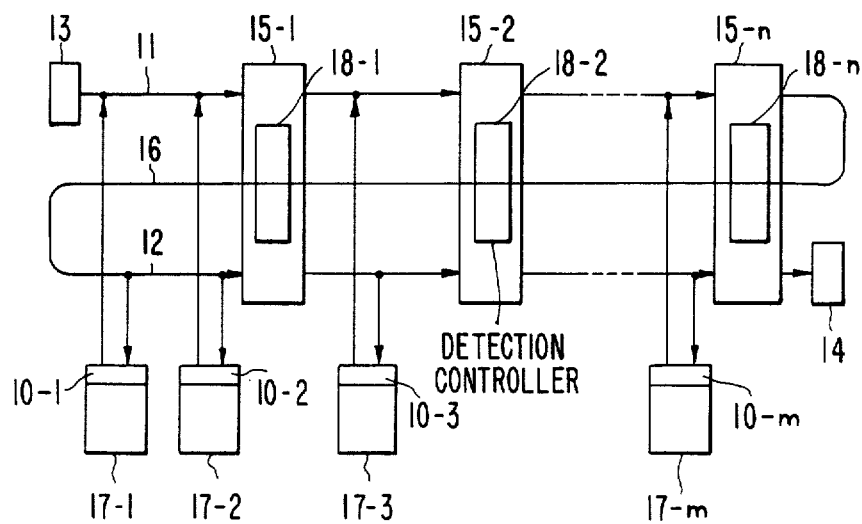
FIG. 10 is a block diagram of a bus type communication system which uses the repeaters shown in FIG. 8 in an S-shaped transmission line system.

FIG. 10 is a schematic diagram of an embodiment of the present invention adapted to the S-shaped transmission line. The like parts as those in FIG. 7 are given like symbols. 18-1 to 18-n are detection controllers, each of which comprises collision detecting means, carrier detecting means, collision pattern detecting means, preamble generating means and control means, etc., as in FIG. 8. Carrier detection and collision detection are carried out in the same way as in the previously-discussed embodiment by the detection controllers 18-1 to 18-n. That is, detection occurs without regard to the transmission delay caused by the return loop 16, the data transmission units 17-1 to 17-m realize carrier and collision detection within a short period using the collision pattern or preamble pattern through return transmission at the repeaters 15-1 to 15-n.

Figure 11:
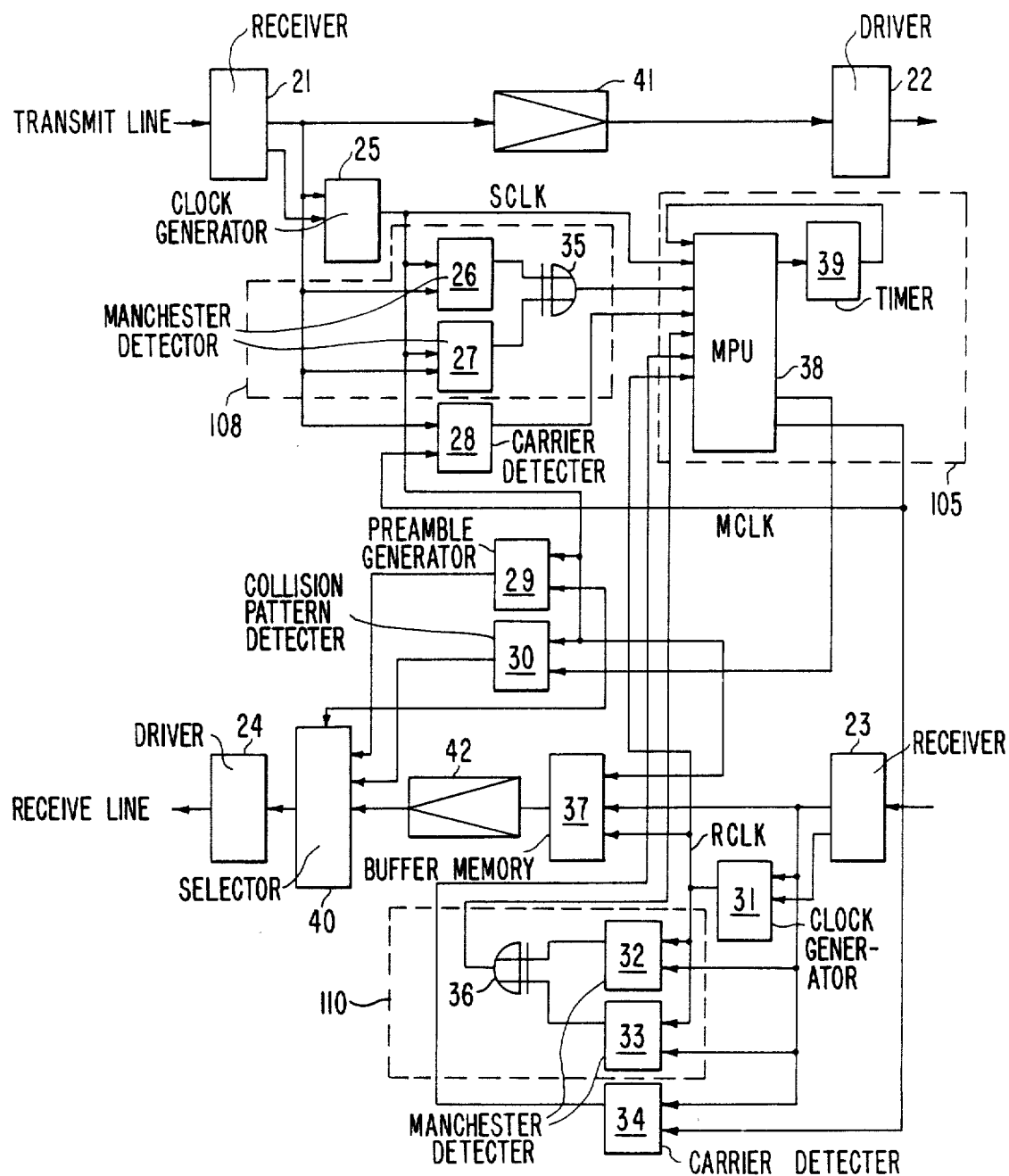
FIG. 11 is a detailed block diagram of a repeater according to the present invention which is used in an optical communication system.

FIG. 11 is a more detailed block diagram of the repeater used in the embodiment of the present invention. The receiver 21 receives the data transmitted through the transmit line, extracts the clock signal from the data and applies the clock signal and data to the clock generator 25. The receiver 23 receives the data transmitted through the receive line, extracts the clock signal from such data and applies the clock signal and data to the clock generator 31. The driver 22 transmits the data amplified by the amplifier 41 back to the transmit line, while the driver 24 transmits the data, the collision pattern and the preamble pattern, etc. selected by the selector 40 to the receive line.

When the transmit line and receive line are optical fibers, the receivers 21 and 23 and drivers 22 and 24 are respectively provided with a photo-electric converter, which receives an optical signal and converts it into an electrical signal, or converts an electrical signal into an optical signal. When the transmit and receive lines are formed using coaxial cables, level conversion is carried out.

The amplifiers 41 and 42 comprise an equalizing amplifier and a waveform shaping circuit. The amplified signal is transmitted to the transmit line from the driver 22 and to the receive line from the driver 24, respectively. The clock generators 25 and 31 comprised of phase locked loops (PLL) which output the clock signals SCLK and RCLK, respectively, which are phase locked with the clock signals extracted from the received data. The clock signal SCLK output by the clock generator 25 is supplied to the microprocessor 38, Manchester code detectors 26 and 27, preamble generator 29, collision pattern generator 30 and buffer memory 37. The clock signal RCLK output from the clock generator 31 is supplied to Manchester code detectors 32 and 33, buffer memory 37 and microprocessor 38.

The Manchester decoders 26 and 27 (32 and 33) decode the Manchester encoded data received by the receiver 21 (23). A Manchester code is formed by transmitting the original bit, inverting the original bit and transmitting the inverted bit. For example, the original data of 3 bits "101" becomes "011001". Therefore, the Manchester code bits corresponding to the first bit is decoded by the decoder 26(32), the Manchester code bit corresponding to the second bit is decoded by the decoder 27 (33). When the Manchester code rule is satisfied, the decoded outputs of the decoders 26 and 27 (32 and 33) become equal respectively. When the decoded outputs are equal, the output signal of an exclusive OR circuit 35 (36) is "0".

When the output signal from the exclusive OR circuits 35, (36) is "1", the data being transmitted does not satisfy the Manchester code rule indicating that a collision has occurred. The collision detection signal output by the exclusive OR circuits 35 (36) is applied to microprocessor 38.

When the carrier detection signal is output by the carrier detector 28 and the collision detection signal is not output by the exclusive OR circuit 35, the microprocessor 38 outputs a control signal to the preamble generator 29 to start generation of the preamble pattern. The microprocessor 38 also controls the selector 40 to apply the preamble pattern to the driver 24 to be transmitted to the receive line. Accordingly, the preamble pattern is transmitted to the receive line before it is returned through the return loop and thereby the busy condition of the transmission line can be detected by other data transmission units.

The timer 39 is started by microprocessor 38 based on the carrier detection signal sent from the carrier detector 28. The timer signal is monitored by the microprocessor 38 to determine whether a carrier detection signal is provided by the carrier detector 34 within a specified period starting from carrier detection signal provided by detector 28 and when carrier is detected within the specified period, the microprocessor 38 recognizes that normal communication is being carried out.

The data received by the receiver 23 through the receive line is applied to the buffer memory 37, and written therein based on the clock signal RCLK sent from the clock generator 31, the data is then read out by the clock signal SCLK from the clock generator 25 and applied to the amplifier 42. When the carrier on the receive line is normally detected, the microprocessor 38 controls the selector 40 and transmits the output signals of amplifier 42 to the receive line driver 24 through the selector 40.

When the collision detection signal from the exclusive OR circuit 35 is applied to the microprocessor 38 for example, when the number of collision detection signals of value "1" produced by the exclusive OR circuit 35 are more than a specified number within the specified period, the microprocessor 38 determines that a data collision has occurred, starts the collision pattern generator 30 with a control signal and also controls the selector 40, to thereby send the collision pattern to the receive line through the driver 24.

When the collision detection signal from the exclusive OR circuit 36 is applied to the microprocessor 38, for example, when the number of collision detection signals of value "1" produced are more than the specified number within the specified period, the microprocessor 38 determines that a collision pattern has been detected, and when the microprocessor has already activated the collision pattern generator 30 in accordance with detection of a collision by the exclusive OR circuit 35, the microprocessor stops transmission of the collision pattern or collision data using selector 40 because it has already informed the other data transmission units that a collision has occurred. When the collision pattern generator 30 has not been just operated, the microprocessor 38 operates the collision pattern generator 30 with the control signal and transmits the collision pattern to the receive line.

Figure 12:
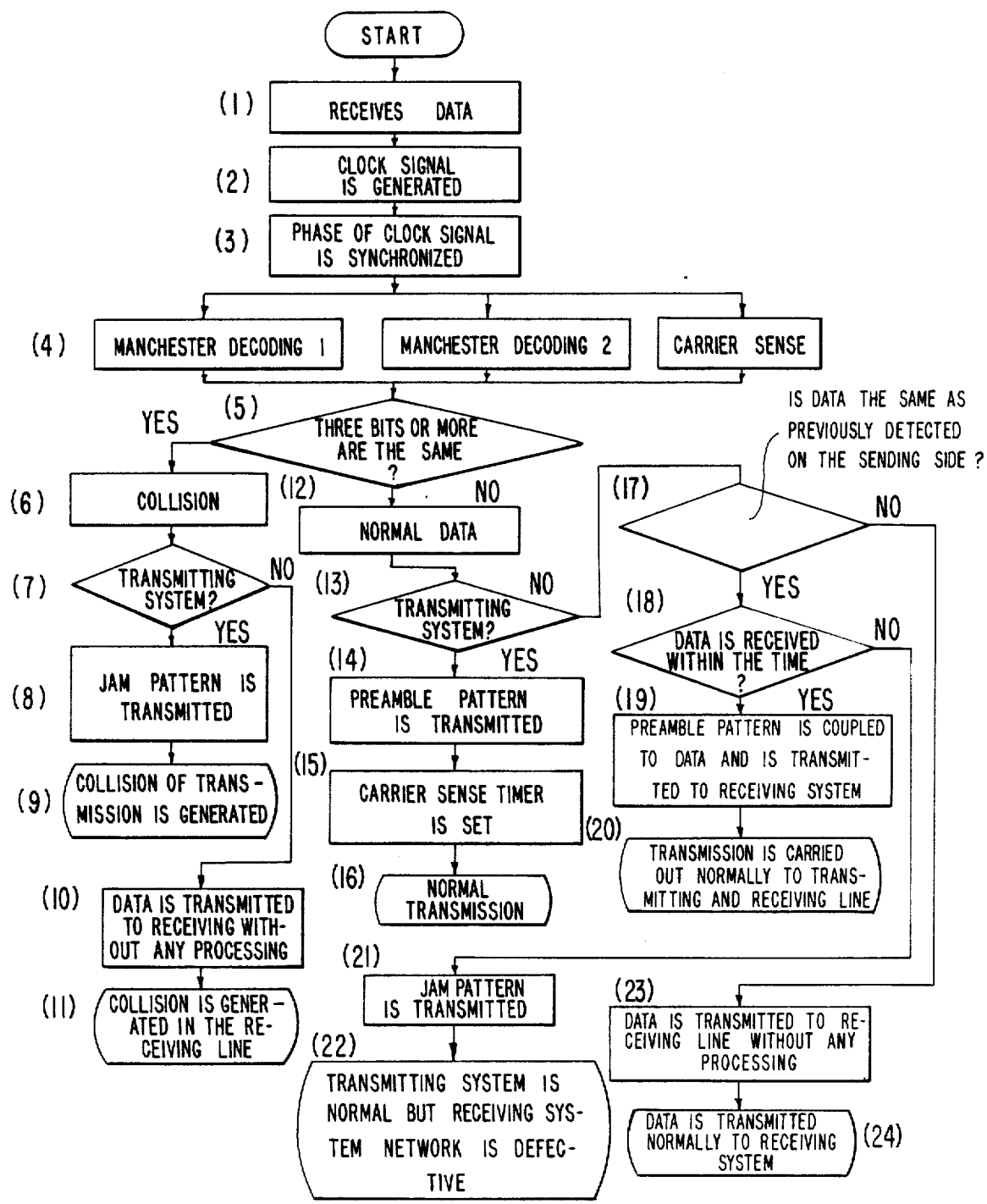
FIG. 12 is a flow chart of the operation of the repeater of FIG. 11 in an optical communication system.

FIG. 12 is a flow chart of operation of the repeater previously explained, in which steps (1)–(24) describe events as well as actions taken by the microprocessor 38 and other circuits of FIG. 10. The receiver 21 on the transmit side or the receiver 23 on the receive side receives the data (1), then the clock signal is generated from the received data by the clock generators 25 and 31 (2). Next, the phase of clock signal is synchronized by a phase synchronization circuit, etc. (not shown) (3), and Manchester decoding 1 and 2 as well as carrier sense are carried out at the same time in accordance with such clock signal (4). Manchester decoding 1 indicates the decoding of the Manchester code by the decoders 26 and 32 while Manchester decoding 2 indicates the decoding of the Manchester code by the decoders 27 and 33.

Since the Manchester code does not allow the same codes to continue for three bits or more, the decoding determines whether three consecutive bits or more are the same (5). This step of determining whether the results of the Manchester decodings 1 and 2 are equal is performed by the exclusive OR circuits 35 and 36. When it is determined that the codes are not the same for three bits or more in correspondence with carrier detection the data is judged to be normal (12). Then a determination is made as to whether the data is from the transmit line (13). When the data is from the transmit line, the preamble generator 29 is started, the selector 40 is controlled, the preamble pattern is transmitted (14) and the carrier sense timer 39 is set (15). When the carrier of the receiving system is detected within the specified period as explained previously, the transmission is judged to be normal (16). In addition, the data transmission unit can determine immediately that the transmission line is busy via detection of the preamble pattern applied to the receive line.

In the step (5), when three bits or more are the same, a collision has occurred (6). The source of the collision in accordance with the collision detection signal sent from the exclusive OR circuit 35 or the collision detection signal sent from the exclusive OR circuit 36 is determined (7). When the signal is from the transmit line, a jam pattern is transmitted (8), namely the collision pattern generator 40 is started and the selector 40 is controlled to transmit the collision pattern to the receive line through the driver 24 and it is indicated that the collision pattern transmission has been initiated (9).

In the step (7), when it is determined that a collision has not occurred on the transmit line, data is transmitted to the receive line without any processing (10) and it is indicated that collision has occurred in the receive line (11). When collision is indicated in the receive line due to the collision detection signal from the exclusive OR circuit 36, the collision data received through the receiver 23 is transmitted directly through the driver 24. Such collision data is abnormal data and is transmitted allowing detection of a collision by other transmission units and thereafter the correct data is transmitted during the re-transmission process.

When it is determined that collision has occurred in the receive line in step (13) because the carrier detection signal is output by the carrier detector 34, a determination is made as to whether the data has already passed by on the transmit line (17). If the data has already passed by on the transmit line, a determination is made (18) as to whether the data has been received within the time set by the timer 39 in step (15). When the data is received within the preset time, the preamble pattern sent from the preamble generator 29 is coupled to the data from the buffer memory 37, and transmitted to the receiving system through the control of selector 40 and an indication that transmission is being performed normally on the transmitting and receiving lines occurs.

In the step (18), if data is not received within the preset time, it indicates that a failure may have occurred in the repeater or transmission line or a collision may have been generated. Therefore, the jam pattern is transmitted (21), namely the collision pattern generator 30 is started, the selector 40 is controlled to output the collision pattern and an indication that the transmitting system is normal but the receiving system network is defective (22) occurs.

In the step (17), when data is not the same, the data is transmitted to the receiving system without any processing (23) and it is indicated that data is being transmitted normally in the receiving system (24).

As explained above, the detection controller of repeater controls carrier detection, detection of a collision, transmission of a preamble pattern and transmission of a collision pattern, and the detection controller can be constructed from logical circuits or a microprocessor 38 operating under program control. The networks discussed have been the U-shaped transmission line of FIG. 9 or the S-shaped transmission line of FIG. 10, however, the repeater can also be used in a star system. In the above embodiment, the data encoded using Manchester code is used as an example, however, other types of encoded data can also be used and collision can be detected by disturbance of the coding rules in the other encoding systems.

Figure 13:
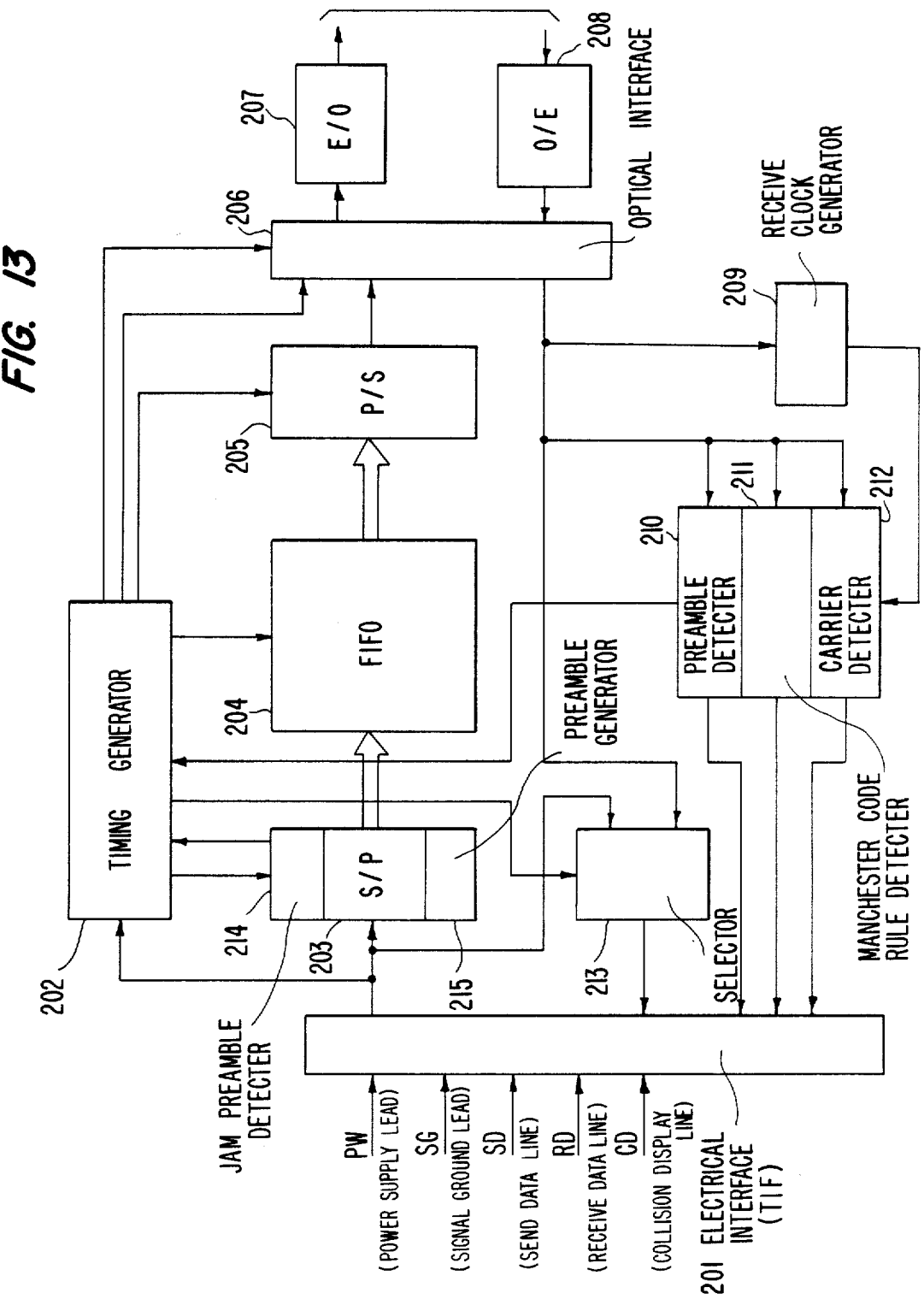
FIG. 13 is a block diagram of the essential portions of an optical transceiver.

A transceiver for connecting data transmission equipment having an interface in accordance with IEEE regulation 802.3 to the above-mentioned optical communication system will be explained. FIG. 13 shows a block diagram of an interface and optical transceiver corresponding to interfaces 10-1, 10-2 to 10-$m$ shown in FIGS. 9 and 10, for connecting the above-mentioned data transmission. An optical signal sent from the optical network is converted into an electrical signal by the optical/electric converter 208. This electric signal is applied to the receiving clock generator 209, preamble detector 210, Manchester code rule detector 211, carrier detector 212 and selector 213 through the optical interface 206. The selector 213 is controlled by the timing signal sent from the timing generator 202 and the signal sent from the optical interface 206 is applied to the electric interface 201 at a timing other than the transmission timing.

The receive clock generator 209 has a well-known construction which extracts the clock component by means such as a resonant circuit. The preamble detector 210 has a construction which detects the preamble pattern and since the preamble pattern is usually formed by the repetition of "10101010", detector 210 can be detected with a simple logic circuit. The Manchester code rule detector 211 detects whether the signal satisfies the Manchester code rule where data "1" is "10", while "0" is "01" and such can be detected easily because the code "1" does not continue for three or more bit in the Manchester code. When data collision occurs, the optical signal is superposed and the optical signal does not satisfy the Manchester code rule, and, as a result, collision can be easily determined by using the Manchester code rule. The carrier detector 212 is used for detecting whether the optical signal exists on the optical network.

The memory 204 is a buffer memory from which the data written previously is read and has a construction suitable for parallel processing 1-byte at a time. The serial processing of the data is also possible but the write and read operation in such serial processing must be improved in speed and timing before it is practical. When an output gate (not shown) is opened in the memory 204 by a timing signal from the timing generator 202, the read data is output as 1-byte in parallel.

A preamble generator 215 generates a preamble pattern to be written to the memory 204, while the serial-to-parallel converter 203 converts the serial transmit data and preamble pattern into parallel data. A jam pattern detector 214 is used to detect a jam pattern generated by the connecting device and added by the electric interface 201. The serial-to-parallel converter 205 converts the parallel data read from the memory 204 into serial data. The converted serial data is applied to the electric/optical converter 207 through the optical interface 206 and is then converted into an optical signal. The converted optical signal is transmitted to the optical network.

The timing generator 202 can comprise a microprocessor which generates the timing signals for controlling each part in synchronization with the signal sent from the electric interface 201. Moreover, when the jam pattern sent from the connecting device is applied to the jam pattern detector 214 through the electric interface 201, the jam pattern is detected and the detection signal is applied to the timing generator 202. The timing generator 202 then applies the simple jam pattern to the optical interface 206. This jam pattern is applied to the electric-photo converter 207 from the optical interface 206, then converted to an optical signal and transmitted to the optical network.

When there is no sending data on the send data line SD, the preamble pattern produced by the preamble generator 215 is sequentially written into the memory 204 in accordance with the timing signal sent from the timing generator 202 after serial-to-parallel conversion. Since the output gate (not shown) of memory 204 is closed at this time, an output is not applied to the optical interface 206. When there is not an optical signal in the optical network, a detection signal indicating an idle line is output from the carrier detector 212 and the idle condition is indicated to the connecting device through the electric interface 201 over the receiving data line RD.

When data is applied to the send data line SD by connecting device, the data is detected by the electric interface 201, the clock is extracted and the timing generator 202 is controlled. The output gate of the memory 204 is opened, the send data is converted to parallel data by the serial-to-parallel converter 203 and is then applied to the memory 204. The selector 213 is also controlled so that it returns the send data to the electric interface 201 and the send data on the send data line SD is returned to th receive data line RD. Accordingly the preamble pattern is first read and transmitted from the memory 204 and then the sending data is read and transmitted therefrom. Since the connecting device detects carrier using the receive data line RD, it can be determined from the data returning from the selector 204 during transmission that the connecting device in question is transmitting the data.

When the send data is all transmitted from the send data line SD, the memory 204 which is filled with the preamble pattern and the send data and all the data are all read and transmitted. When there is no sending data in the memory 204, the output gate of memory 204 is closed and transmission of preamble pattern into the memory 204 is performed. Then, the selector 213 changes the selected path from the path where the data is returned to the electric interface 201 to the path where data is sent to the electric interface 201 from the optical interface 206.

The transmission collision detecting function is started in the optical network at the timing where the preamble is transmitted as previously described above. When the transmission of the preamble pattern having a length corresponding to the delay time of transmission line is completed, a check is made for the occurrence of a transmission collision. If any of carrier detection (a) indicating use of transmission line at the start of transmission, reception (b) of a preamble from the receive side of optical network during transmission of the preamble pattern and detection (c) of normal Manchester code rule is missed, a transmission collision has occurred, and a collision indication pattern is sent to the collision indication line CD and simultaneously the return data is disturbed thereby indicating a collision to the connecting device. The connecting device transmits the jam pattern (collision emphasizing signal) through the sending data line SD, the jam pattern is transmitted to the optical interface 206 by the timing generator 202, converted to an optical signal by the electric/optical converter 207 and then transmitted to the optical network. Thereby, transmission collision is indicated to other units.

An optical signal sent from the optical network is converted to an electrical signal by the optical/electric converter 208, then applied to the electric interface 201 through the selector 213 from the optical interface 206 and is then transferred to the connecting device from the electric interface 201 via the receiving data line RD.

Figure 14:
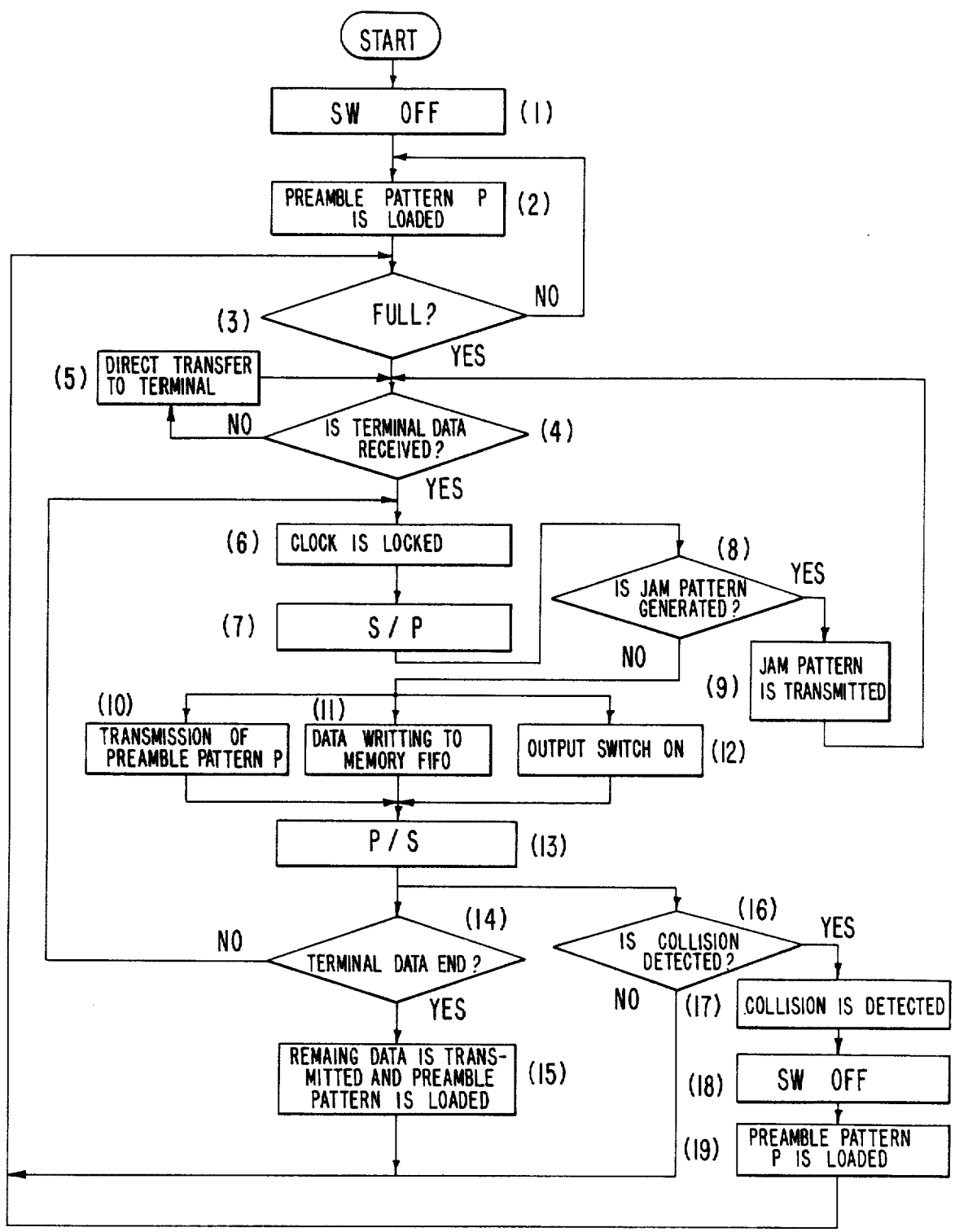
FIG. 14 is a flow chart of the operation of an optical transceiver.

FIG. 14 is a flow chart of the control performed by the timing generator 202 of FIG. 13 as well as events which occur in other elements of FIG. 13. SW OFF (1) indicates that an output switch of an output gate, etc. of the memory 204 is turned OFF. In such a condition, the preamble pattern P is loaded (2) in the memory 204 and when the preamble pattern P is fully loaded (3), a determination is made concerning whether terminal data is being received (4) (reception of data from the connecting device). When data is not received from the terminal, the data is directly transferred (5) to the terminal (connecting device) by selector 213. This means that data is being received by the terminal from the optical network. In this situation, the data converted by the electric/optical converter 208 sent from the optical network is transferred to the electric interface 201 through the selector 213 from the optical interface 206 and is further transferred to the terminal (connecting device) as the receive data through the receive data line RD.

When data is being received from the terminal, the data is transmitted to the optical network as follows. The clock (CLK) is locked (6) in the electric interface 201 and the data transferred from the electric interface 201 is subjected to the serial-to-parallel conversion S/P (7) by the serial-to-parallel converter 203. Next, it is determined (8) whether the jam pattern is generated. When jam pattern is generated, the timing generator 203 transmits (9) the jam pattern.

When the jam pattern is not generated, the operations of transmitting (10) the preamble pattern P, writing (11) data into memory FIFO and turning (12) ON the switch are performed. Parallel-to-serial conversion P/S (13) is then carried out in the parallel-to-serial converter 205. That is, the output switch of output gate, etc. of the memory 204 turns ON and the preamble P which is previously loaded to the memory 204 is transmitted. During this period, data is written into the memory 204 and when transmission of preamble pattern P is completed, the stored data is read and transmitted. The parallel data read from the memory 204 is applied to the optical interface 206 via parallel-to-serial conversion using the parallel-to-serial converter 205.

When the end of data being received from the terminal is determined (14) detection of collision is performed (15), residual data is transmitted and the preamble pattern P is loaded (16). That is, any data remaining in the memory 204 is transmitted and the preamble pattern is loaded into the memory 204.

Collision is determined by detection of Manchester code rule violations, carrier detection and detection of the preamble pattern. When a collision is detected (16), such is indicated to the terminal (connecting device). The memory output switch is turned off SW/OFF (17), the preamble pattern P is loaded (18) into the memory 204.

Since the preamble pattern P can be added to the heading area of data as previously discussed above, if the heading part is partially lost by the optical repeater, the address area still remains and communication can be continued. Therefore, the length of the preamble pattern P to be added by the optical transceiver is determined in consideration of the optical repeater. For example, the length of preamble pattern P is 1024 bits in the preferred embodiment. The memory 204 storing the preamble pattern P is an FIFO in the embodiment mentioned above but it can also be formed using a shift register or ring memory, etc.

The many features and advantages of the invention are apparent from the detailed specification and, thus, it is intended by the appended claims to cover all such features and advantages of the circuit which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to falling within the scope of the invention.

What is claimed is:

1. An optical communication system which transmits data after an idle condition is confirmed, said system comprising:
   a one-way transmission optical bus line comprising a single line including a transmit line, a return loop and a receive line;
   a plurality of data transmission means, operatively connected to said one-way transmission line, for transmitting data over the transmit line when the idle condition is detected and receiving data from each other; and
   repeater means, operatively connected to said bus line, for amplifying the data transmitted between said data transmission means, said repeater means comprising:
      first detection means, operatively connected to said transmit line, for detecting data on the transmit line;
      second detection means for detecting the data on the receive line; and
      monitor means, operatively connected to said first and second detection means, for monitoring a time period between detections by said first detection means and said second detection means and indicating system failure when the time period is greater than a predetermined value.

2. An optical communication system as recited in claim 1, further comprising transmitting signal means for producing a transmitting signal indicating data transmission and applying the transmitting signal to the receive line in dependence upon the detection by said first detection means.

3. An optical communication system as recited in claim 1, further comprising failure signal means for producing a failure signal indicating abnormal data transmission and applying the failure signal to the receive line when said second detection means does not detect the data in the predetermined time period after said first detection means detects the data.

4. An optical communication system as recited in claim 1, wherein each of said data transmission means comprises:
   conversion means for converting an optical signal into an electrical signal and an electrical signal into an optical signal; and
   preamble adding means for adding a preamble signal to the optical signal before transmission.

5. An optical communication system which transmits data after an idle condition is confirmed, said system comprising:
   a one-way optical transmission line comprising a single line including a transmit line, a return loop and a receive line;
   a plurality of data transmission means, operatively connected to said one-way transmission line, for transmitting data over the transmit line when the idle condition is detected and receiving data from each other; and
   repeater means, operatively connected to said one-way transmission line, for amplifying data which is transmitted by said data transmission means, said repeater means including:
      collision detection means for detecting a data collision on said one-way transmission line;
      collision pattern generating means for generating and transmitting a predetermined collision pattern to the receive line when said collision detection means detects the data collision;
      carrier detection means for detecting a carrier which indicates a normal data transmission on said one-way transmission line; and
      preamble generating means for generating and transmitting a preamble pattern to the receive line when said carrier detection means detects the carrier.

6. An optical transceiver connected between an optical transmission line and a data transmission unit, said transceiver comprising:
   conversion means for converting an optical signal, including a message portion and a preamble, into an electrical signal including the preamble and an electrical signal into an optical signal; and
   preamble extension means for extending the preamble before transmission by a number of preamble bits greater than a number of preamble bits expected to be lost during transmission and compensating for expected loss of preamble bits during data transmission.

7. An optical transceiver as recited in claim 6, further comprising collision detection means for detecting data collision on the optical transmission line.

8. An optical transceiver as recited in claim 6, further comprising data return means for returning transmitted data from the data transmission unit to the data transmission unit.

9. An optical transceiver as recited in claim 6, wherein said preamble extension means includes first-in first-out memory means for storing the preamble before data transmission.

10. A repeater connected to a transmit line and a receive line, the transmit and receive lines being connected by a return loop, said repeater comprising:
   transmit line detecting means, operatively connected to the transmit line, for detecting data on the transmit line;
   return signal transmitting means, operatively connected to said transmit line detecting means and the receive line, for transmitting a return signal on the receive line in dependence upon the detection by said transmit line detecting means;

receive line detecting means, operatively connected to the receive line, for detecting the data on the receive line;

monitor means, operatively connected to said receive line detecting means and said transmit line detecting means, for monitoring the time between detection by said transmit line detecting means and said receive line detecting means and producing a time exceeded signal when the time exceeds a predetermined value; and failure signal transmitting means, operatively connected to said monitor means and the receive line, for transmitting a failure signal on the receive line in dependence upon the time exceeded signal.

* * * * *

UNITED STATES PATENT AND TRADEMARK OFFICE
CERTIFICATE OF CORRECTION

PATENT NO. : 4,727,592

DATED : February 23, 1988

INVENTOR(S) : Akihiro Okada et al.

It is certified that error appears in the above-identified patent and that said Letters Patent is hereby corrected as shown below:

Column 3, line 27, "14" s/b --4--;

Column 3, line 44, delete "for" (second occurrence).

Column 4, line 31, "patter" s/b --pattern--.

Column 7, line 25, after "repeater," insert --it can be--.

Signed and Sealed this

Twenty-eighth Day of June, 1988

*Attest:*

DONALD J. QUIGG

*Attesting Officer*          *Commissioner of Patents and Trademarks*